United States Patent
Fiene

(10) Patent No.: US 6,218,962 B1
(45) Date of Patent: Apr. 17, 2001

(54) PARKING GUIDE FOR AUTOMATIC GARAGE DOOR OPENERS

(76) Inventor: Dale E Fiene, 622 Gaslight Dr., Algonquin, IL (US) 60102

( * ) Notice: Subject to any disclaimer, the term of this patent is extended or adjusted under 35 U.S.C. 154(b) by 0 days.

(21) Appl. No.: 09/452,119

(22) Filed: Nov. 30, 1999

(51) Int. Cl.[7] .................................................. B60Q 1/48
(52) U.S. Cl. .................. 340/932.2; 340/686; 340/425.5; 340/51; 340/32; 340/933
(58) Field of Search .............................. 340/932.2, 686, 340/425.5, 51, 32, 933

(56) References Cited

U.S. PATENT DOCUMENTS

| | | | | |
|---|---|---|---|---|
| 3,874,322 | * | 4/1975 | Brauner | 116/28 R |
| 3,977,354 | | 8/1976 | Mazurek | 116/28 R |
| 3,998,285 | | 12/1976 | Coo | 180/1 AP |
| 4,036,165 | | 7/1977 | Wood | 116/28 R |
| 4,101,868 | | 7/1978 | Bubnich | 340/932 |
| 4,145,681 | | 3/1979 | Bubnich | 340/51 |
| 4,383,238 | * | 5/1983 | Endo | 340/32 |
| 4,641,994 | | 2/1987 | Hankison | 404/6 |
| 4,665,378 | * | 5/1987 | Heckethorn | 340/51 |
| 4,813,758 | | 3/1989 | Sanders | 359/515 |
| 4,931,767 | * | 6/1990 | Albrecht et al. | 340/425.5 |
| 4,965,571 | | 10/1990 | Jones | 340/932 |
| 5,052,113 | * | 10/1991 | Aquino | 33/264 |
| 5,127,357 | | 7/1992 | Viskovich | 116/28 R |
| 5,184,132 | * | 2/1993 | Baird | 341/176 |
| 5,189,802 | | 3/1993 | Bergfiel | 33/264 |
| 5,556,692 | | 9/1996 | Zheng | 428/156 |
| 5,617,087 | * | 4/1997 | Scott | 340/932.2 |
| 5,883,579 | * | 3/1999 | Schreiner et al. | 340/686 |

* cited by examiner

Primary Examiner—Jeffery Hofsass
Assistant Examiner—Hung Nguyen

(57) ABSTRACT

An automatic garage door opener with an integral or add-on parking guide. The driver of the vehicle is provided with continuos visual feedback as to how far to drive forward into the garage by a narrow line or beam of light which appears at first on the front of the hood. The driver proceeds forward until the line or beam of light coincides with a reference position on the vehicle. The reference position can be an existing feature of the vehicle, such as, a corner of a speaker grill or it can be a target decal that is added to the vehicle at the time of installation.

13 Claims, 2 Drawing Sheets

PARKING GUIDE FOR AUTOMATIC GARAGE DOOR OPENERS

CROSS REFERENCES TO RELATED APPLICATIONS

Not applicable

BACKGROUND

1. Field of Invention

This invention relates to garage door openers, specifically to a technique for providing a method for accurately positioning a vehicle a fixed distance from the front wall of a garage.

2. Description of Prior Art

Ever since the turn of the century when Henry Ford made automobiles a household item, the owners have been struggling with parking larger and larger vehicles in garages which often are barely large enough to hold the vehicle let alone the bicycles, lawn mowers, etc. which all need to be stored in the garage. In an effort to provide a guide to avoid running into the extra equipment and also provide a path to get around the front or the back of the vehicle, a number of techniques have been used. Placing a piece of lumber, such as a 2×4, on the floor or hanging a tennis ball from the ceiling provides a very simple and inexpensive solution, but both have significant disadvantages. In the case of the 2×4, the driver is never certain as to whether the 2×4 has been inadvertently kicked from its' desired location while the vehicle was out of the garage. Gluing or bolting the 2×4 to the floor can solve the problem of accidental displacement, it now becomes dangerous to the point where some one accidentally contacting the 2×4 may trip and injure himself. Also, permanently attaching the 2×4 to the floor requires that it be removed and relocated when the next vehicle is purchased. Although the tennis ball will not move because it is permanently attached to the ceiling and does not create a safety hazard, it does become very annoying to continually walk around the dangling tennis ball or balls in the case of a two car garage if the garage is used for anything other than parking a vehicle.

A product, which is slightly more sophisticated than the 2×4, is sold on the market for 29.99 a pair. It is sold as the "Park Smart Mat". This product consists of a mat with two rubberized bumps spaced about a foot apart, and is made of super durable, highly visible yellow rubber-like material, which is oil and gas resistant. The mat is placed on the garage floor so that the front wheel will be located between the two bumps when the vehicle is positioned the desired distance from the front wall. This product obviously suffers from the same problems as the 2×4. It can be kicked out of place and tripped over.

A number of more costly solutions are also on the market. One device called the "StopLite Vehicle Positioning System" consists of two parts. One piece is mounted on the ceiling above the vehicle. A second unit is mounted on the wall in front of the vehicle. The ceiling unit contains an infrared sensor that monitors the position of the vehicle. The second unit, which is mounted on the front wall, flashes yellow as the vehicle enters the garage and then red when the vehicle reaches the desired stopping point. This product requires the annual replacement of two batteries, one in the wall unit and one in the ceiling unit. Adjusting the overhead sensor requires climbing up on a ladder and adjusting the mounting plate of the sensor. Another shortcoming is that there is no continuous feedback of where the vehicle is relative to the desired stopping point. The unit flashes yellow telling you to slow down, but then abruptly turns red when you have reached the desired stopping point.

Another product on the market, called the Park-Zone, consists of two pieces connected by a coiled cord assembly similar the cord on a telephone handset. Both units are mounted on the front wall. The sensor unit is mounted at bumper level and contains an ultrasonic sensor by POLAROID®. The display unit is mounted above the sensor at roughly the eye level of the driver. This product has three lights (green, amber and red). The green light turns on as the vehicle enters the garage. Midway the green light turns off and the yellow lamp comes on. When the light changes to red you stop the vehicle. This product also suffers from the lack of continuous feedback of the vehicle's position relative to the desired stopping point. The green light illuminates as you enter the garage. Midway the amber light becomes illuminated and when you have reached the desired stopping point the red light illuminates. Thus, there is an abrupt change from amber to red. The operating instructions warn that the actual stopping point will vary depending on the reaction time of the driver and the speed at which the vehicle is moving when the light turns red. The instruction state to allow for a 6 to 12-inch variation in this stopping distance. This particular unit also continuously produces an audible "pinging" sound produced by the ultrasonic sensor. This can be very annoying if the garage is occupied for extended periods of time. The installation instructions also warn that activity in front of the car, such as during repairs, will keep triggering the display causing shortened battery life. The instructions also state that the sensor requires a flat surface to bounce the sound waves off of. This can be a problem on some vehicles that may have a relatively pointed bumper and no front license plate. Still another problem with this system is that, if the unit is powered from the AC power line, the device has to be re-calibrated after every power outage. Yet another problem is that the front wall can not be used for storage, since the sensor requires an unobstructed view of the front of the vehicle.

OBJECTS AND ADVANTAGES

Several objects and advantages of my invention are that there are no objects on the floor which one might trip over and no distracting objects dangling from the ceiling. There is no need to keep an area on the front wall clear for the mounting of any hardware. In the preferred embodiment, the integration of the parking guide feature directly into the garage door opener or as an add-on option to the garage door opener makes it more cost effective than providing after market devices and also eliminates the need to mount, install and calibrate additional hardware. Yet my invention provides the ability to more precisely locate the vehicle and it provides continuous feedback to the driver of the location of his vehicle relative to the door and/or from the desired parking location. In addition, in the case of a two-car garage with a double door, the same unit can work for both vehicles.

Still further objects and advantages will become apparent from a consideration of the ensuing description and accompanying drawings.

Figure 1:
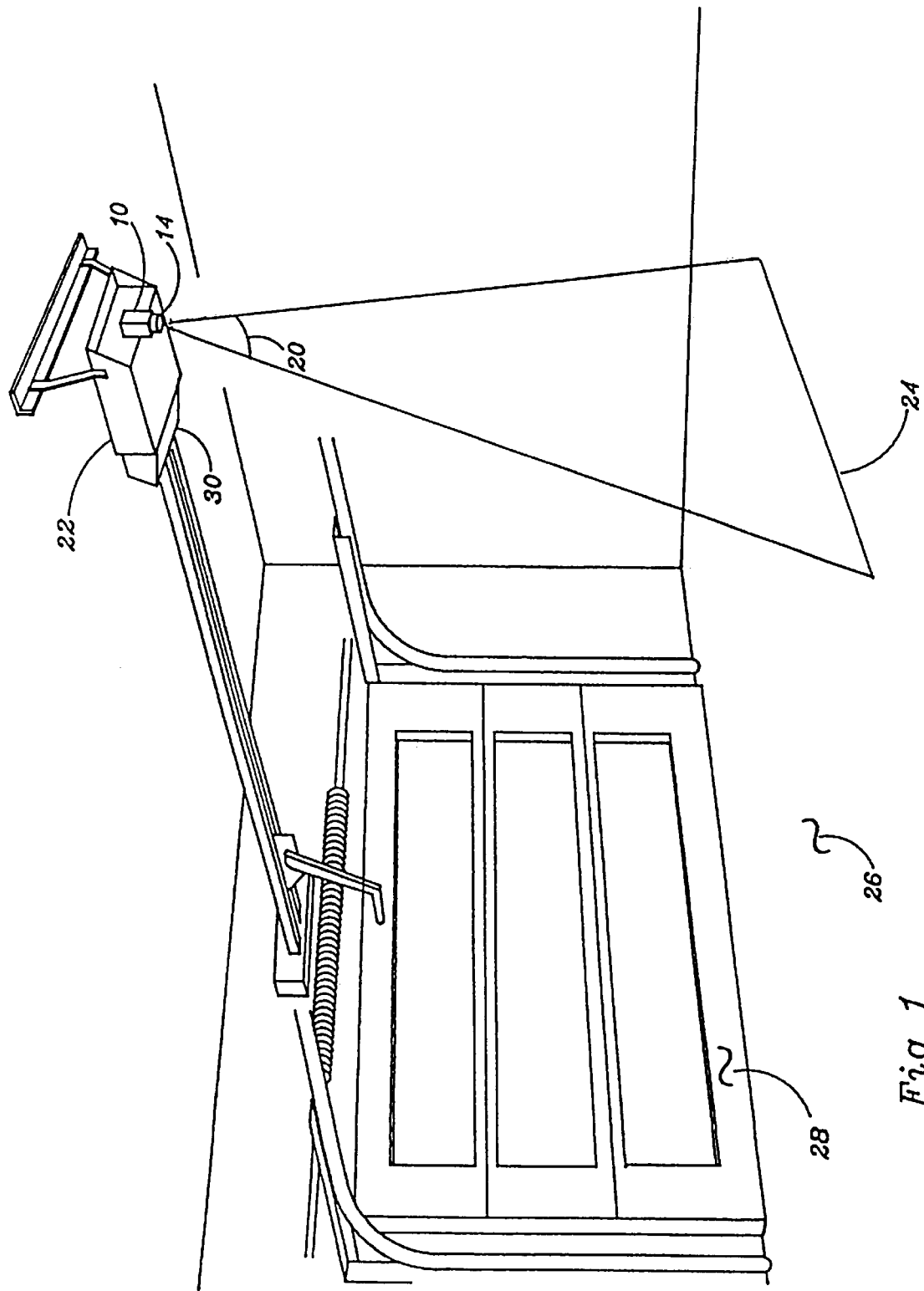
FIG. 1 shows a pictorial diagram of the parking guide incorporated into an automatic garage door opener.

| Reference Numerals |
|---|
| 10 parking guide |
| 12 integral regulated power supply |
| 14 beam spreader lens |
| 16 laser diode assembly |
| 18 input power leads |
| 20 fan angle |
| 22 automatic garage door opener |
| 24 visible line |
| 26 garage floor |
| 28 garage door |
| 30 courtesy light |
| 32 step-down transformer |
| 34 full-wave bridge rectifier |
| 36 filter capacitor |
| 38 zener diode |
| 40 voltage dropping resistor |
| 42 pair of power supply input terminals |
| 44 pair of power supply output terminals |
| 46 AC input terminals |
| 48 positive terminal |

SUMMARY

This invention uses a light source in combination with an automatic garage door opener to provide an indication to the driver of a vehicle, as to where the vehicle is relative to a pre-slected ideal parking location within a garage. This indication is in the form of a focused visible light source that is projected onto the surface of the vehicle. The source may use an incandescent lamp or a laser. The focused light can be in the shape of a line, a cross hair, "T", or a spot. The invention can be configured to derive its power from the opener itself or from a separate source. The indicating light source can be pulsed to make the indication more noticeable. The focused light source can turn on with the opener's courtesy light or designed to only turn on if the opener is activated by a remote control transmitter. In some cases it is also desirable to have the focused light source turn off before the courtesy light of the opener. In a stand-alone version the motion of the vehicle activates the unit.

Preferred Embodiment—Description

Referring to FIG. 1 there is shown a pictorial view of the parking guide 10 incorporated into an automatic garage door opener 22. The beam spreader lens 14 is oriented to project a visible line 24 onto the garage floor 26 when the parking guide 10 is activated. The visible line also being parallel to the bottom of the garage door 28. A courtesy light 30 is often supplied as a standard feature on most garage door openers.

Figure 2:
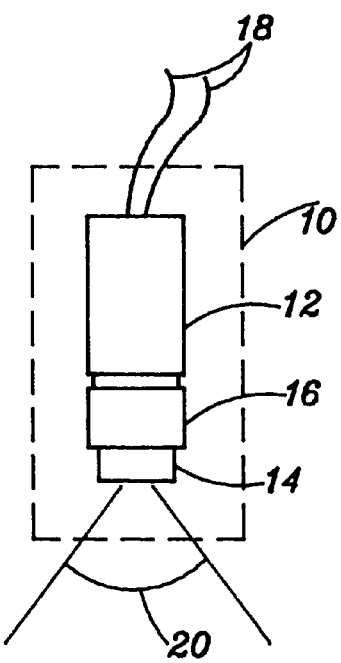
FIG. 2 shows an exploded view of the major component of the parking guide.

Referring to FIG. 2 there is shown the major components of the parking guide 10. The apparatus includes a laser diode assembly 16 is powered from a regulated power supply 12. A beam spreader lens 14 is placed in front of the aperture of the laser diode assembly 16 resulting in a very narrow beam of coherent light emanating from the beam spreader lens 14 when power is applied to the input power leads 18. The beam spreader lens 14 can be a hologram or a diffraction grating lens. By using a beam spreader lens 14 with a fan angle 20 of 90 degrees a 14-foot line can be projected onto the garage floor from a distance of 7 feet.

Figure 3:
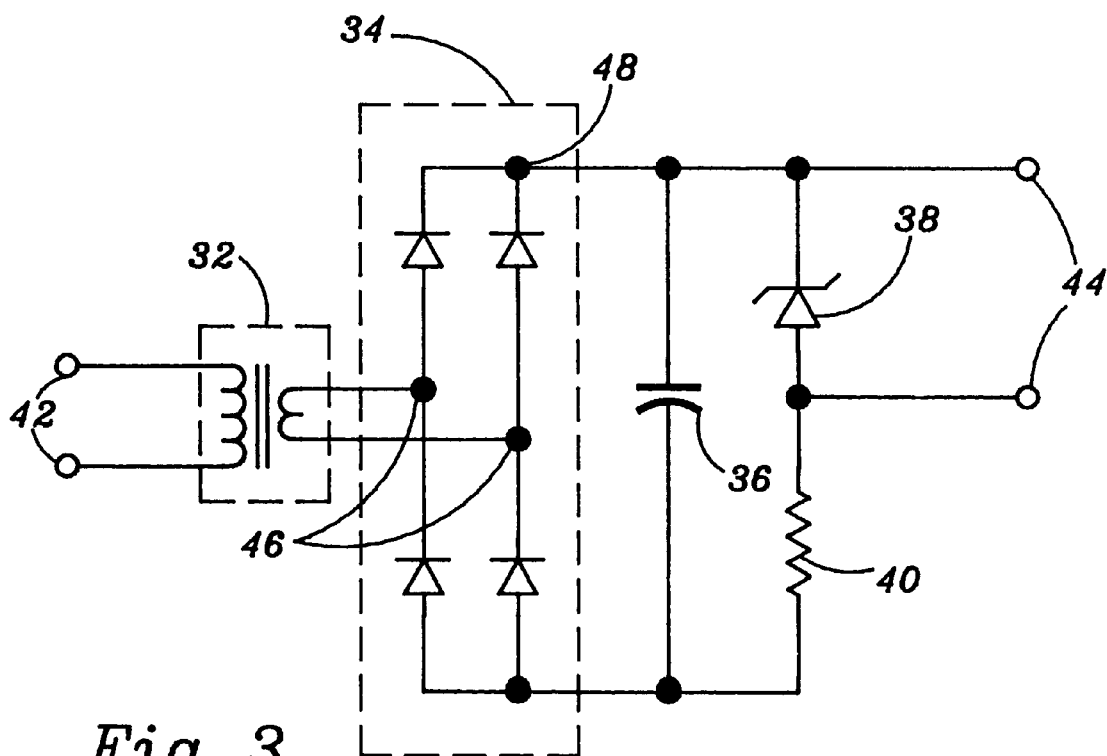
FIG. 3 shows a schematic drawing of a power supply for the parking guide.

FIG. 3 shows a schematic diagram of a power supply. The primary winding of a step-down transformer 32 is connected to a pair of power supply input terminals 42. A secondary winding of the step-down transformer 32 is connected to the AC input terminals 46 of a full-wave bridge rectifier 34. A filter capacitor 36 is connected across the output of the full-wave bridge rectifier 34. A zener diode 38 in series with a voltage dropping resistor 40 is connected across the filter capacitor 36 with the cathode of the zener diode 38 connected to the positive terminal 48 of the full-wave bridge rectifier 34. A pair of power supply output terminals 44 are connected across the zener diode 38. In one possible embodiment of the invention the pair of power supply input terminals 42 are connected to the same source of power as the courtesy light. The pair of power supply output terminals 44 are connected to the input power leads 18 (in FIG. 2) of the parking guide 10. If the automatic garage door opener is designed with the intention of incorporating the parking guide feature this added power supply can be eliminated since there are appropriate DC voltage already available within the automatic garage door opener.

Preferred Embodiment—Operation

This description describes an application in which an automatic garage door opener is used on a two-car garage door. The operation of the instant invention is very simple and straightforward. When a vehicle approaches the garage, the driver uses the standard remote control transmitter to activate the garage door opener. At approximately the same time as the courtesy lamp turns on, power is also applied to the input power leads 18 of the parking guide 10 which projects a narrow visible line onto the garage floor. As the vehicle enters the garage the line is eventually projected onto the hood of the vehicle. The driver proceeds forward until the line projected onto the vehicle coincides with a reference location on the vehicle, which had been previously identified as corresponding to the desired parking position of the vehicle, during the set-up procedure. Assuming that parking guide is provided on the part of the automatic garage door opener which is located closest to the front wall, the reference location is likely to be a particular location on either the driver's side or passenger's side door depending on whether the vehicle is entering the right or left stall. In some cases, depending on the length of the vehicle and the desired parking location relative to the front wall, this line could fall on the dashboard or the window or the back seat. A small stick-on or decal target can be provided with the unit or supplied by the consumer to use as a reference location. When the vehicle reaches this point the driver can be certain that the closing garage door will clear the rear bumper.

Using my invention it is possible to use multiple reference locations. The forward most location on the vehicle can represent the point at which the door first clears the rear bumper. A second reference location can represent a parking location which provides a couple of feet in back of the vehicle for trunk access. A third can represent the parking location where the vehicle is as close as possible to the front wall. Since the width of the laser generated line is so narrow, the vehicle can be parked within a fraction of an inch of the same location each time.

Another advantage of my invention over the other products currently on the market is that it also works equally well if you occasionally back the vehicle into the garage. All it takes is a second set of reference markers which have been installed or identified to represent the desired parking locations for the vehicle when it is backed-in. These reference markers will generally be located on the side windows of the back seat. A further advantage is that once the reference locations have been identified, the vehicles can be parked in either stall, that is, the calibration is provided on the vehicle and not in the parking aid. An additional advantage is that when a new vehicle is purchased the parking guide does not have to be re-aimed or adjusted; it is only necessary to remember a new reference location or add reference targets to the new vehicle.

The parking guide will turn off after a preset time period. The parking guide can use the same time delay circuit as is normally used for the courtesy light generally provided on garage door openers or it may be desirable to have a separate timer which is only activated by the remote control transmitter. In this case the laser diode line generator will not turn on when the garage door opener is activated by the manually activated push button, often mounted by the access door to garage. In this way the laser diode will not be turned on when children may be opening the garage door to take their bikes out of the garage, thus eliminating any concern that children may be tempted to look into the laser generated light.

On dark colored vehicles it may be difficult to see a red laser generated line, therefore it may be desirable to have the light pulsed on and off to make the light more noticeable.

Ideally the parking guide will be incorporated into the automatic garage door opener, but more likely it would be provided as an optional add-on to be mounted onto automatic garage door opener. The distance from a garage door to the back panel of the automatic garage door opener is ten feet and the distance from the rear bumper to the back edge of the front window of larger vehicles can also be ten feet; therefore, in some cases it will be necessary to provide an extender bracket to move the light source forward. This is also helpful when using the invention on garage door openers for single garage doors since it will insure that the line is projected onto the dashboard of the vehicle. Another option is to physically mount the unit to the ceiling and run the leads back to the garage door opener. This will insure that the line will be projected onto the hood or dashboard of the vehicle.

Alternative Embodiment 1—Description

This embodiment is basically the same as the preferred embodiment except that the beam spreader lens is eliminated. As a result the laser diode assembly generates a very intense small 1diameter spot on the order of ⅛ inches in diameter and a separate parking guide is required for each vehicle. Since this embodiment uses a spot instead of a line, it is generally necessary that the parking guide be mounted either on a bracket attached to the automatic garage door opener, which extends out toward the front wall of the garage or on the garage ceiling so that the spot can be aimed at a relatively flat surface, such as, the vehicle's dashboard or hood. When mounted on a bracket extending forward from the automatic garage door opener, two parking guides can be mounted on the same bracket for use in a two-car garage. When mounted on the ceiling two parking guides can be mounted together between the two vehicles, or more ideally from a functional perspective, one unit mounted over each vehicle's hood or dashboard. In both cases the parking guides are mounted on an articulated arm so that the parking guide can be aimed at a specific feature on the dashboard or hood.

The source can be a focused beam of light from an incandescent lamp, a dot from a laser source, a "T" from a laser source or a crosshair from a laser source. Placing a lens containing a hologram of a "T" or crosshair in front of the laser diode assembly creates the "T" or crosshair. In addition, the source can be steady or made to pulse to increase visibility. In the case of the focused incandescent source, colored filters can be used to increase visibility on the various colored surfaces. The indicator source can be programmed to come on when the door is opened and stay on for some preset period that may or may not be the same time as the courtesy light on the opener, and could be turned off sooner by the door being closed. It also may be designed to come on only when the garage door opener is activated from the remote control to avoid the possibility of young children being able to stare into the intense light source when the door is opened by the manual door control button.

Alternative Embodiment 1—Operation

The operation using this embodiment is very similar to that of the main embodiment except that this embodiment gives the driver of the vehicle an additional piece of information which is the vehicle's distance from the side wall of the garage. As the vehicle moves forward into the garage the focused light source will appear on the vehicles hood. During the initial setup procedure with the vehicle located in the desired parking location, the focused light source can be aimed at the edge of the driver's side of the hood. Doing so allows the driver to use the edge of the hood as a guide as he drives forward, thus maintaining a predefined distance from the nearest side wall of the garage.

Using a focused spot of light with this embodiment makes the parking guide less useful or not at all useful for occasions when the vehicle is backed into the stall of a two-car garage since the spot will likely end up on the top of the vehicle and not be visible to the driver. This potential shortcoming can be reduced if not eliminated by using a "T", crosshair, or similar lens in front of the laser diode assembly. With this arrangement there are two lines at right angles to one another. During the initial setup the intersection of the two lines is aimed at the reference location with the vehicle parked in the desired parking location. One line is made parallel to the front wall and garage door. The other line is therefore parallel to the side walls of the garage.

As the vehicle drives forward into the garage a line begins to appear on the hood. The driver drives forward keeping the line on the drivers-side edge of the hood and stops when the perpendicular line arrives at the reference location. When a vehicle is backed into either stall of a two-car garage the driver can still use the line which is parallel to the front wall and garage door as a reference as how far to back into the garage in the same manner as was used in the preferred embodiment. Here again several reference locations may be used to provide various desired parking locations.

Conclusion, Ramifications, and Scope

Accordingly, it can be seen that the parking guide disclosed in this specification provides a very effective and low cost solution to being able to consistently park a vehicle in the same optimum or various preferred parking locations within a garage.

Although the description above contains many specificities, these should not be construed as limiting the scope of the invention but as merely providing illustrations of some of the presently preferred embodiments of this invention. Various other embodiments and ramifications are possible within it's scope. For example, the laser is a very cost-effective technology to use for generating a high intensity line or spot, but an incandescent lamp with a proper lens and reflector can also be used to generate a well-defined and intense line or spot. The parking guide is described as being powered from the automatic garage door opener, but it can be powered from an independent battery or separate AC power source. The parking guide is discussed as turning on from a signal within the automatic garage door opener, but it can also be activated from other sources, such as, a passive-infrared motion detector.

Thus the scope of the invention should be determined by the appended claims and their legal equivalents, rather than by the examples given.

I claim:

1. An arrangement comprising:

a remote controlled garage door opener;

said remote controlled garage door opener providing a source of electrical power;

said arrangement also including a focused or intense light source aimed down in the general direction of the garage floor;

said focused or intense light source being powered from a source of electrical power;

said focused or intense light source projecting a narrow line or lines of light substantially parallel to the bottom edge of the garage door;

said narrow line or lines having end point, when projected on to the garage floor, which are separated by a distance substantially equal to the width of the vehicle to be parked.

2. The arrangement recited in claim 1 wherein the focused or intense light source is generated by a laser diode.

3. The arrangement recited in claim 1 wherein the arrangement includes a hologram or diffraction grating lens.

4. The arrangement recited in claim 1 wherein the focused or intense light source is an integral part of the remote controlled garage door opener.

5. The arrangement recited in claim 1 wherein said arrangement includes an enclosure to enclose a motor;

the focused or intense light source being attached to said enclosure.

6. The arrangement recited in claim 1 wherein the arrangement includes a remote control radio frequency transmitter;

said remote control radio frequency transmitter being capable of activating said remote control garage door opener;

the arrangement also including a manual push button switch located within the garage capable of activating the automatic garage door opener;

the focused intense light source being turned on for a period of time only when the automatic garage door opener is activated from said remote control radio frequency transmitter;

said focused or intense light source not being turned on when the automatic garage door opener is activated from said manual push button switch.

7. The arrangement recited in claim 1 wherein said arangement also includes a courtesy lamp, which remains lit for a fixed period of time after the garage 1 door opener is activated;

the focused or intense light source turns off after a brief period or some short period after the door begins to close, whichever action occurs first;

said brief period being less than said fixed period.

8. The arrangement recited in claim 1 wherein the focused or intense light source pulses on and off at least once every few seconds.

9. The arrangement recited in claim 1 wherein said arrangement is used in combination with an add-on target placed on or inside the vehicle;

the add-on target not being an existing part of the vehicle.

10. The arrangement recited in claim 1 wherein said arrangement provides a guide function for locating a vehicle a specific distance from the garage door;

said arrangement being installed in a multi-vehicle garage with a double garage door;

said arrangement, when so installed, requiring only a single focused or intense light source to provide said guide function for two different vehicles parked in the adjacent stalls accessed via said double garage door.

11. The arrangement recited in claim 1 wherein when used in a two-car garage with a double garage door, said arrangement is still functional when a vehicle is backed into the garage without the need to relocate or re-aim the focused or intense light source.

12. An arrangement comprising:

a remote controlled garage door opener;

said remote controlled garage door opener providing a first source of electrical power;

said first source of electrical power being turned on for a given period of time, at least under certain conditions, when or shortly after the automatic garage door opener begins opening the garage door, said arrangement also including a focused or intense light source aimed down in the general direction of the garage floor;

said focused or intense light source being powered from said first source of electrical power;

said arrangement works equally well for a vehicle parked in either the left or the right stall of a two or more car garage without relocating or re-aiming the focused light source.

13. A device comprising:

a sensor to sense the movement of a vehicle;

said sensor including an electrically activated switch;

said sensor activating electrically activated switch when movement is sensed;

a source of focused or intense light;

a source of electrical power;

said source of focused or intense light being connected to the source of electrical power at least for a period of time when said electrically activated switch is activated by said sensor;

a vehicle within a garage;

said source of focused or intense light striking a pre-defined location on the vehicle, but only when the vehicle is in a previously identified location within the garage.

* * * * *